United States Patent
Kawazoe et al.

(10) Patent No.: US 6,493,619 B2
(45) Date of Patent: Dec. 10, 2002

(54) LANE KEEPING ASSISTANCE SYSTEM AND METHOD FOR AUTOMOTIVE VEHICLE

(75) Inventors: Hiroshi Kawazoe, Kanagawa (JP); Masayasu Shimakage, Kanagawa (JP); On Sadano, Kanagawa (JP); Shigeki Sato, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/930,168

(22) Filed: Aug. 16, 2001

(65) Prior Publication Data

US 2002/0169531 A1 Nov. 14, 2002

(30) Foreign Application Priority Data

Sep. 5, 2000 (JP) .......... 2000-268218

(51) Int. Cl.[7] .......... G06F 165/00; G05D 1/00
(52) U.S. Cl. .......... 701/41; 701/28; 701/117; 701/96; 701/118; 701/223; 180/168; 340/435
(58) Field of Search .......... 701/41, 28, 42, 701/117, 118, 207, 211, 220, 223, 225, 301, 96; 180/168, 169; 340/435, 436; 342/456

(56) References Cited

U.S. PATENT DOCUMENTS 5,208,750 A   5/1993  Kurami et al. .......... 364/424.02
6,155,106 A  12/2000  Sano .......... 73/118.1
6,226,592 B1  5/2001  Luckscheiter et al. .......... 701/301

FOREIGN PATENT DOCUMENTS

EP  0 640 903  3/1995
JP  9-240502   9/1997

Primary Examiner—William A. Cuchlinski, Jr.
Assistant Examiner—Arthur D. Donnelly
(74) Attorney, Agent, or Firm—Foley & Lardner

(57) ABSTRACT

In lane keeping assistance system and method for an automotive vehicle, a control current (Iout) to be outputted to a motor during an automatic steering mode is detected, a filter is provided for the detected control current to pass only signal components of the detected control current whose frequencies are lower than a predetermined cut-off frequency value (fstr, fstr_low, fstr_mid, fstr_hi) to derive a filtered control current (Iout_lpf), a determination of whether a manual steering intervention to the automatic steering occurs is made according to a magnitude of the filtered control current, and the control current outputted to the motor is reduced toward zero when the manual steering intervention is determined to occur according to a result of determination that the magnitude of the filtered control current (Iout_lpf) is in excess of a predetermined threshold current value (Iout_lpf_th).

11 Claims, 9 Drawing Sheets

CONTROL CURRENT FREQUENCY CHARACTERISTIC

LPF CUT-OFF FREQUENCY CHARACTERISTIC USED TO DETERMINE VEHICULAR VELOCITY-DEPENDENT STEERING INTERVENTION

FIG.9

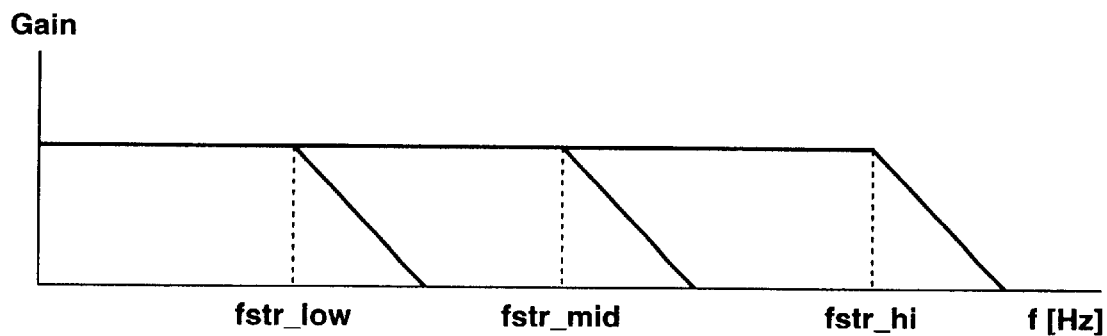

LPF FOR VEHICULAR VELOCITY SWITCHING USED TO DETECT STEERING INTERVENTION CURRENT fstr_low : CUT-OFF FREQUENCY OF LPF USED TO DETECT STEERING INTERVENTION UNDER A LOW VEHICULAR VELOCITY REGION fstr_mid : CUT-OFF FREQUENCY OF LPF USED TO DETECT STEERING INTERVENTION UNDER A MIDDLE VEHICULAR VELOCITY REGION fstr_hi : CUT-OFF FREQUENCY OF LPF USED TO DETECT STEERING INTERVENTION UNDER A HIGH VEHICULAR VELOCITY REGION THE VEHICLE RUNS AT A CENTER OF LANE BY A CORRECTION CONTROL CURRENT AGAINST AN EXTERNAL DISTURBANCE (CANT, LATERAL WIND, AND SO FORTH)

Ym : A VEHICULAR POSITIONAL DEVIATION FROM A LANE CENTER

IF A STEERING IS INTERVENED BY A VEHICULAR DRIVER, THE VEHICLE RUNS IN DEVIATION ALONG ONE OF LEFT AND RIGHT WHITE LINES (ACCORDING TO A DRIVER'S INTENTION)

LANE KEEPING ASSISTANCE SYSTEM AND METHOD FOR AUTOMOTIVE VEHICLE

BACKGROUND OF THE INVENTION

1. Field of the Invention

The present invention relates generally to lane keeping assistance system (also called, a lane following vehicle control system, but, hereinafter, is referred to the lane keeping assistance system) and method for an automotive vehicle. The present invention relates more particularly to a technical field of the lane keeping assistance system and method in which an automatic steering is carried out in such a way that a traffic lane information is retrieved during a vehicular run and a steering torque is given to a steering force transmission system to follow the vehicle along a traffic lane at a forward direction of the vehicle or a driver's steering operation is supported to follow the traffic lane at the vehicular forward direction by providing a steering reaction torque is given to a vehicular steering force transmission system.

2. Description of the Related Art

In general, the lane keeping assistance system has a region in which the vehicle can autonomously run along a white line and in which a development force by an actuator does not give an influence on a steering intervention. Hence, it is necessary to reduce the development force by a control quickly if a driver's steering intervention occurs.

On the other hand, in a system in which a gear direct drive power steering is used, a torque sensor mounted on a column shift of a steering wheel can directly be used to determine the driver's steering intervention.

A Japanese Patent Application Publication No. Heisei 9-240502 published on Sep. 16, 1997 exemplifies a previously proposed lane keeping assistance system.

In the above-described Japanese Patent Application Publication, a torque sensor is installed to detect a steering torque from a vehicular driver in order to switch between an automatic steering and a manual steering by an accurate trap of an intention of the vehicular driver. When an output of the torque sensor is below a predetermined threshold value, a control mode is shifted into an automatic steering mode. When an output of the torque sensor is equal to or above the predetermined threshold value, the control mode is shifted into the manual steering mode.

SUMMARY OF THE INVENTION

However, an automotive industry has demanded the following requirements for the lane keeping assistance system. That is to say, (1) Since a system cost becomes high with a correction for a drift of an output value of the torque sensor taken into consideration, the system cost is required to be reduced, and (2) Since it is necessary to make a part of a steering shift to which a steering torque is transmitted smaller in a diameter (torsion bar), a torsional rigidity of a steering system is reduced and a steering feeling thereof becomes worsened. Hence, the vehicular steering system is required to maintain its torsional rigidity and steering feeling thereof.

Therefore, it is, according to the requirements, difficult to mount the torque sensor in the steering system in terms of the steering performance and in terms of the cost. Then, in a case where such a direct driver's steering intervention detecting device as described above is not present, a steering angle sensor (having a steering angular velocity output value) is used for a steering intervention determination.

However, it is possible for the steering angle sensor to detect the driver's steering intervention only if a certain steering angular velocity occurs. Since the determination of the steering intervention in which no steering angular velocity is developed cannot be carried out, the determination of the steering intervention cannot be made in a case where a steady-state steering intervention (steering angular velocity ≈0°/S (zero degree per second)) is carried out.

Since the steering operations by the vehicular driver and by the steering control are interfered against each other, a large driver's undesired feeling of the steering operation (a dull steering and a sticky feeling) occurs.

It is noted that the steady-state steering intervention (steering intervention without no generation of the steering angular velocity) is one of the following cases.

① A case wherein the driver is running on or near to a boundary of the traffic lane (such lane markings as left and right white lines). For example, in a case wherein a large-sized truck is running on an adjacent traffic lane, the vehicle tends to run along a line deviated toward another traffic lane opposite to the adjacent traffic lane on which the truck is running. A case wherein the vehicle is running on the traffic lane near to which a cobble is present aside the traffic lane with a deviation thereof toward the traffic lane side opposite to the cobble.

② A case wherein the vehicle is not running along the white lines but actually is running at a different side-road of the white lines. For example, a case wherein, during a vehicular run on a freeway, a guide-way or taxiway such as a guidance from a traffic lane in the freeway to a service area is brought over. In addition, the steering undesired feeling due to the steering interference is that, in a case of the manual steering intervention, a controlled output is caused to flow in a direction opposite to that caused by the driver's intervention and undesired feelings of steering wheel's weight increase and of a sticky feeling can be given to the driver.

It is, hence, an object of the present invention to provide lane keeping assistance system and method which can accurately determine such a steady-state steering intervention without generation of the steering intervention as described above and which can eliminate a large undesired feeling of steering due to a steering interference.

According to one aspect of the present invention, there is provided a lane keeping assistance system for an automotive vehicle, comprising: a traffic lane information detector (16) to detect an information related to a traffic lane on which the vehicle is about to run; a steering angle sensor (13) to detect a steering angle ($\theta$) of a steering wheel of the vehicle; a steering position changing section (8, 9) by which the steering wheel of the vehicle is enabled to be displaced independently of a manual steering operation through the steering wheel; a controlled steering target value setting section (15, FIG. 12) that sets a controlled steering target value ($\theta^*$) when a controlled steering to follow the traffic lane is carried out on the basis of at least the traffic lane related information detected by the traffic lane information detector and the steering angle detected by the steering angle sensor; a controlled steering command value setting section (15, FIG. 20) that outputs a control command value (Iout) in accordance with the controlled steering target value; a control command value filtering section (15, 22 of FIG. 2, and 62 through 66 of FIG. 6) to filter the control command value to pass only frequency components of the control command value lower than a predetermined filter threshold value (fstr, fstr_low, fstr_mid, fstr_hi) to derive a filtered control command value (Iout_lpf_th) during an execution of the controlled steering; a manual steering intervention detector (15, 23 of FIG. 2, 67 and 69 of FIG. 6) to detect a steering intervention state to the controlled steering by the manual steering operation when the filtered control command value is in excess of a predetermined threshold control command value (Iout_lpf_th); and a controlled steering target value limiter (15, 24 and 25 of FIG. 2, and 70 and 71 of FIG. 6) to reduce the control command value (Iout) toward zero value to suppress the controlled steering target value toward a lower value direction including zero when the manual steering intervention is detected by the manual steering intervention detector.

According to another aspect of the present invention, there is provided a method applicable to a lane keeping assistance system for an automotive vehicle in which a control current is outputted to a motor (8) of an automatic steering actuator coupled to a vehicular steering system (3, 7) to provide a steering force thereto to follow the vehicle along a traffic lane on a road located in a vehicular forwarding direction during a vehicular run in an automatic steering mode, the method comprising: detecting (20 of FIG. 2 and 60 of FIG. 9) the control current (Iout) to be outputted to the motor during the automatic steering mode; providing (22 of FIG. 2, 62 through 66 of FIG. 6) a filter for the detected control current to pass only signal components of the detected control current whose frequencies are lower than a predetermined threshold frequency value of the filter to derive a filtered control current; determining (23 of FIG. 2 and 67 and 69 of FIG. 9) whether a manual steering intervention to the automatic steering occurs according to a magnitude of the filtered control current, the manual steering intervention being determined to occur depending on whether the magnitude of the filtered control current is in excess of a predetermined threshold current value of the filter; and reducing (24 and 25 of FIG. 2 and 70 and 71 of FIG. 6) the control current outputted to the motor toward zero value when, at the manual steering intervention determining step, the manual steering intervention is determined to occur according to a result of determination that the magnitude of the filtered control current (Iout_lpf) is in excess of the predetermined threshold current value (Iout_lpf_th).

This summary of the invention does not necessarily describe all necessary features so that the invention may also be a sub-combination of these described features.

BRIEF DESCRIPTION OF THE DRAWINGS

FIG. 9 is a characteristic graph representing the cut-off frequency characteristic of the low-pass filter used to detect a driver's steering intervention.

DETAILED DESCRIPTION OF THE PREFERRED EMBODIMENTS

Reference will hereinafter be made to the drawings in order to facilitate a better understanding of the present invention.

First Embodiment

Figure 1A:
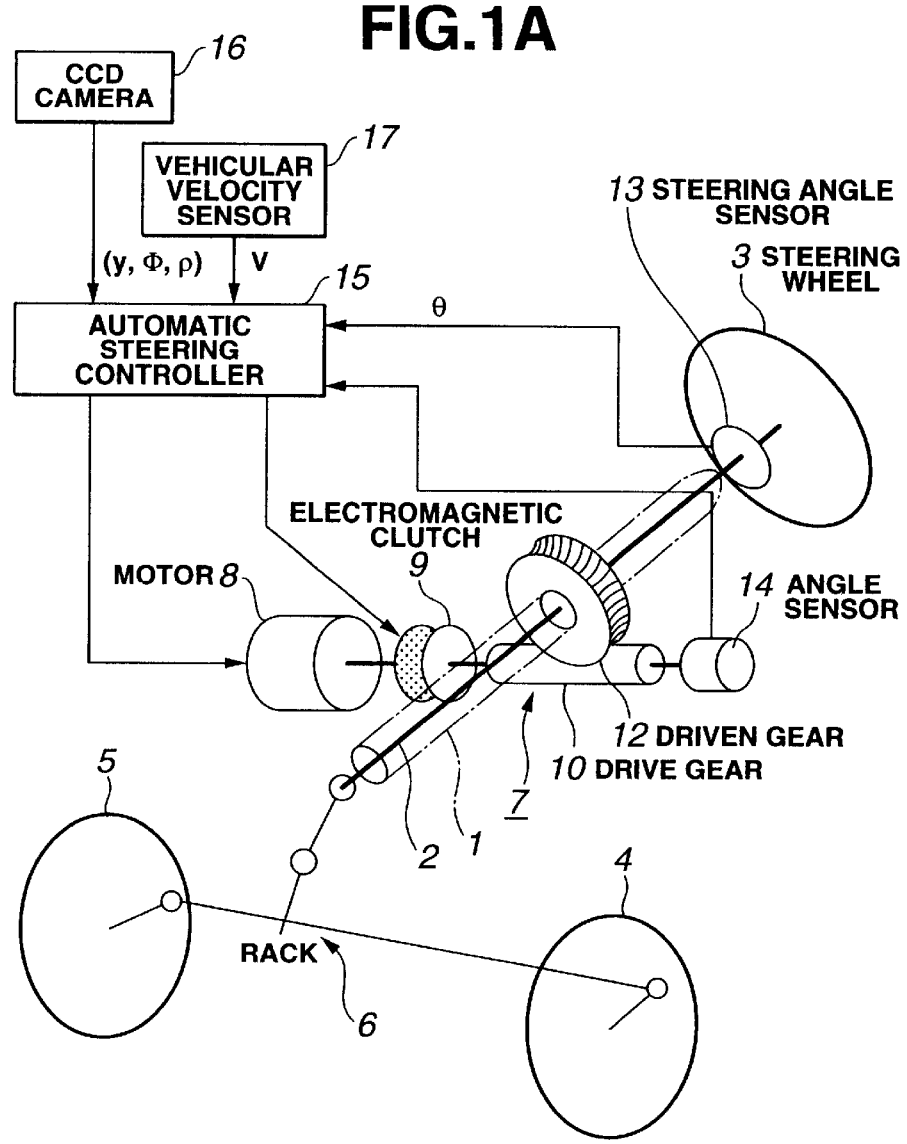
FIG. 1A is a whole system configuration view of a vehicular steering system to which a lane keeping assistance system for an automotive vehicle in a first preferred embodiment according to the present invention is applicable.

FIG. 1A shows a whole system configuration of a steering system of an automotive vehicle to which a lane keeping assistance system in a first preferred embodiment according to the present invention is applicable.

In FIG. 1A, a column shaft 2 is inserted into an inside of a steering column 1 and is supported by the steering column 1. A steering wheel 3 is disposed on an upper end of column shaft 2. A rack-and-pinion steering mechanism 6 is linked to steer left and right road wheels 4 and 5 at a lower end of column shaft 2. An assistance actuator 7 (or so-called, automatic steering actuator) to provide an auxiliary steering torque is disposed at an intermediate position of column shaft 2.

Assistance actuator 7 includes: an electric motor 8; an electromagnetic clutch 9 disposed on a motor axle; a drive gear 10 rotationally driven by motor 8 via electromagnetic clutch 9; and a worm-gear-to-speed-reduction mechanism having a driven gear 12 meshed with drive gear 10.

A steering angle sensor 13 to detect a rotational angle of column shaft 2 is disposed on a position of column shaft 2 is disposed on a position of column shaft 2 placed in proximity to steering wheel 3. An angle sensor 14 to detect a rotational angle of driven gear 10 is disposed. Sensor output signals from steering angle sensor 13 and angle sensor 14 are inputted to an automatic steering controller 15.

Automatic steering controller 15 receives a video signal from a CCD (Charge Coupled Device) camera 16 arranged to photograph a forward road zone in a vehicular forwarding direction and a vehicular velocity indicative signal from a vehicular velocity sensor 17 as well as the sensor output signals from the steering angle sensor 13 and angle sensor 14.

In addition, automatic steering controller 15 outputs a control current via a motor drive circuit 15g to motor 8 and outputs a clutch or de-clutch command to electromagnetic clutch 9.

Furthermore, an automatic steering controller 15 implements an image processing of road images in the vehicular forwarding direction on the basis of the video signal form CCD camera 11, extracts and discriminates boundary lines of a forward traffic lane such as a white line (broken line form) or center (boundary) line (solid line form), and generates a vehicular running state information of a host vehicle (host vehicle means the vehicle on which the lane keeping assistance system is mounted).

In addition, when an automatic steering mode is selected, both of a steering torque and a target steering angle needed to follow the host vehicle along the forward traffic lane are calculated. To make the actual steering angle substantially equal to the target steering angle, automatic steering controller 15 implements a fundamental control of a lane keeping assistance by outputting the control current to motor 8.

Figure 1B:
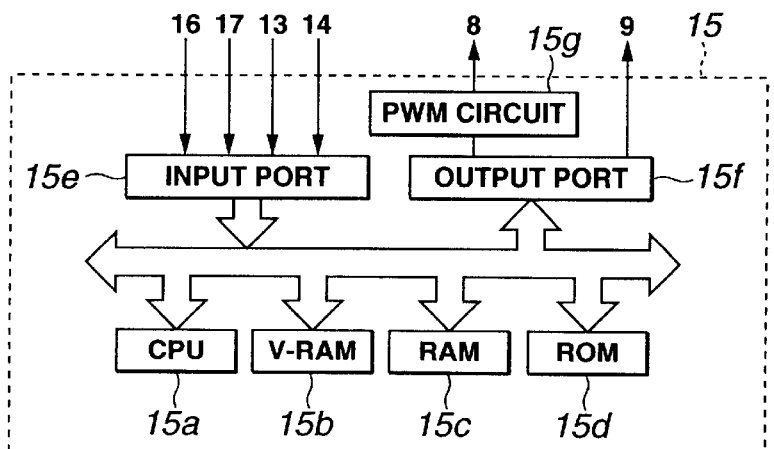
FIG. 1B is a rough configuration of an automatic steering controller of the lane keeping assistance system in the first embodiment shown in FIG. 1.

FIG. 1B shows a basic internal structure of automatic steering controller 15.

Automatic steering controller 15 includes: a CPU (Central Processing Unit, but also called Microprocessor unit) 15a; a V-RAM (Video Random Access Memory) 15b; a RAM (Random Access Memory) 15c; a ROM (Read Only Memory) 15d, an Input Port 15e, an Output Port 15f, motor drive circuit (PWM (Pulse Width Modulation) circuit) 15g, and a common bus.

Next, an operation of the above-described lane keeping assistance system in the first preferred embodiment will be described.

[Steering Intervention Determination Procedure]

Figure 2:
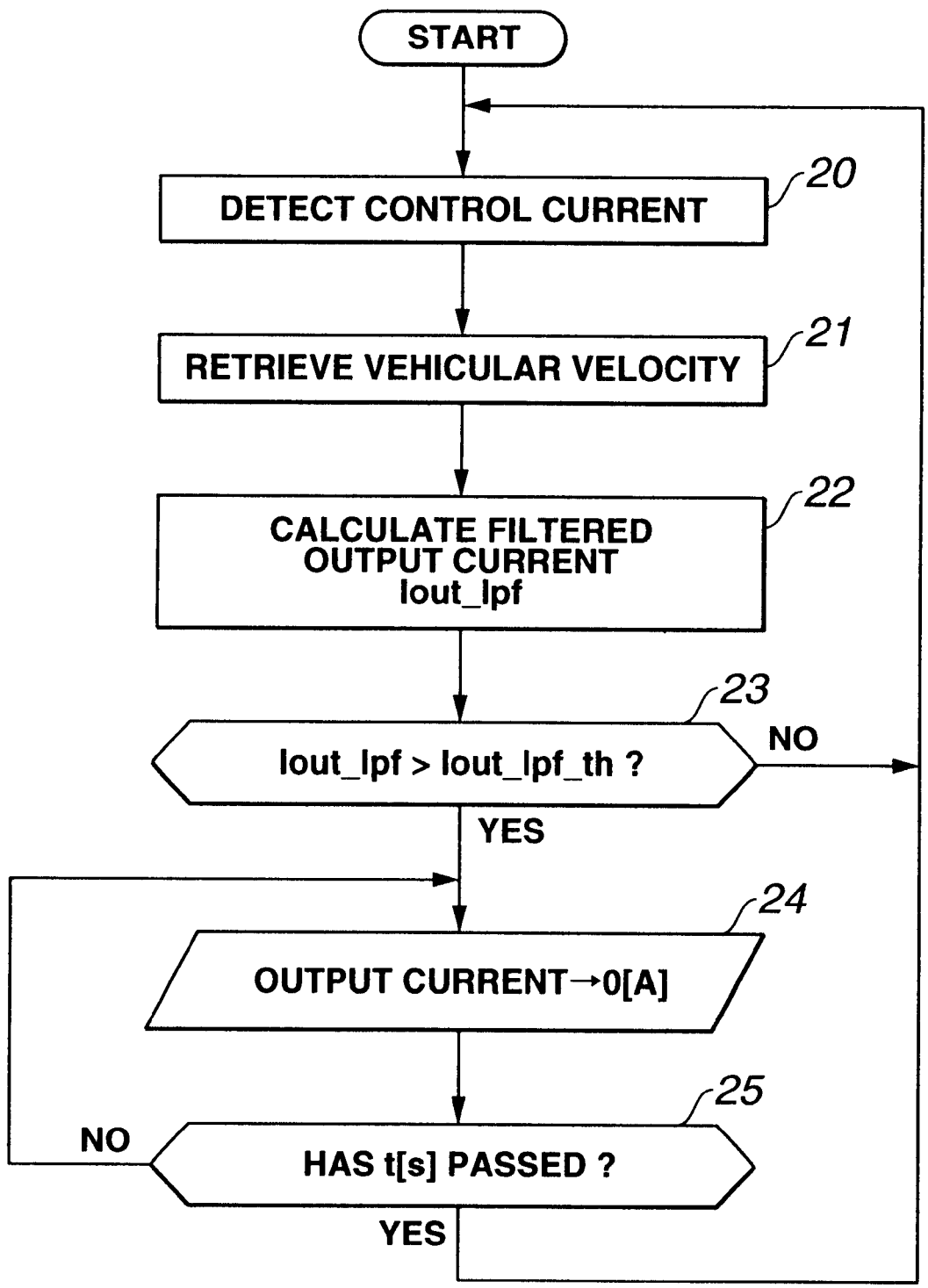
FIG. 2 is an operational flowchart executed by the automatic steering controller shown in FIGS. 1A and 1B for a steering intervention determination procedure.

FIG. 2 is an operational flowchart representing a flow of a steering intervention procedure executed by automatic steering controller 15. Each step shown in FIG. 2 will be described below.

At a step 20, controller 15 detects the control current outputted to motor 8 from controller 15 (via the motor drive circuit 15g).

At the next step 21, controller 15 retrieves the vehicular velocity from vehicular velocity sensor 17.

At the next step 22, controller 15 provides a low-pass filtering process to pass signal components of only a low frequency range for the detected control current at step 20 to calculate a filtered output current Iout_lpf.

It is noted that although a cut-off frequency of the low-pass filter is a predetermined constant value, another low-pass filter having a cut-off frequency variable characteristic such that as the vehicular velocity becomes higher the cut-off frequency is shifted toward a higher direction may be used since the vehicular velocity is retrieved at step 21.

At a step 23, controller 21 determines whether the calculated filtered output current Iout_lpf is in excess of a steering intervention threshold current Iout_lpf_th.

If No at step 23 (Iout_lpf ≦Iout_lpf_th), controller 15 does not determine the steering intervention but returns to step 20. If Yes at step 23 (Iout_lpf >Iout_lpf_th), controller 15 determines that the steering intervention is present and the routine goes to a step 24.

At step 24, controller 15 gradually reduces the output current to 0 [A]. It is noted that, basically, when the steering intervention is determined to be present, the steering control may be turned to off. However, since an abrupt (stepwise) change of a steering force results in a steering unmatched feeling to a vehicular driver, the output current is gradually reduced.

At the next step 25, controller 15 determines whether a time duration from a time at which the answer of Yes is determined at step 23 is elapsed by a set time duration t [seconds]. Until the set time duration t is passed, the reduction process of the control current at step 24 is continued. It is noted that a return condition cannot be determined from the output current since the output current is already reduced and a time management is used to determine an automatic return.

[Steering Intervention Determination Action]

When the vehicle is running during an automatic steering mode, the control current to make the host vehicle follow the traffic lane of the vehicular forwarding road is outputted to motor 8 so that the vehicular run to follow the traffic lane without the driver's steering operation can be assured.

During the vehicular run in the automatic steering mode, controller 15 provides at step 22 in FIG. 2 the low-pass filtering process for the control current outputted to the motor 8 to calculate the filtered output current Iout_lpf. At step 23, if the filtered output current Iout_lpf is in excess of steering intervention output current threshold current Iout_lpf_th, controller 15 determines that the driver has intervened in the automatic steering and the routine goes to step 24. At step 24, the control current for motor 8 of assistance actuator 7 is gradually reduced.

Figure 3:
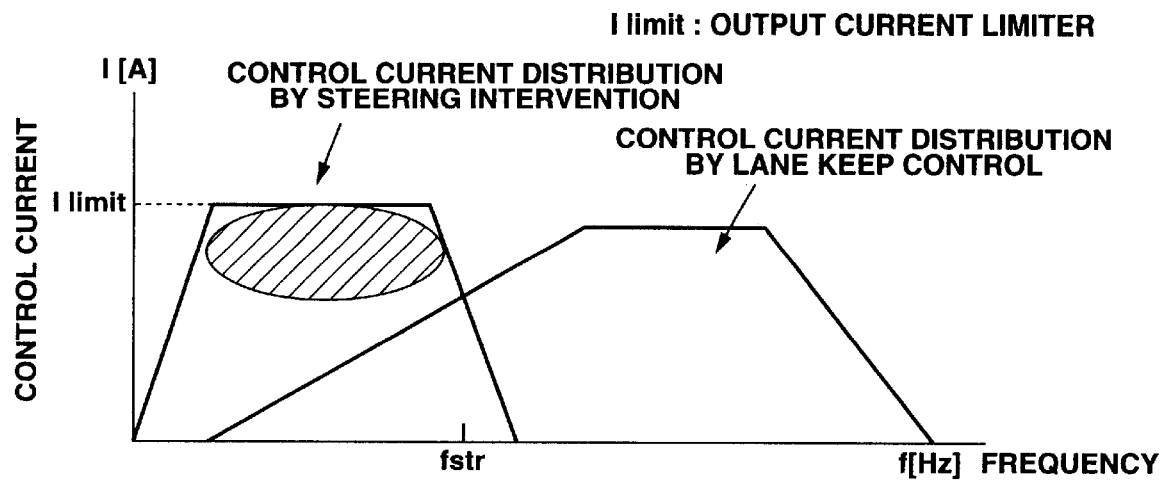
FIG. 3 is a characteristic graph representing control current distributions during the execution of the lane keep control and during a driver's steering intervention.

That is to say, as viewed from a control current distribution during the steering intervention in FIG. 3, the control current distribution by a lane keep control indicates a high density in a proximity to a vehicular yaw resonance of 1 Hz but that by a steady-state steering intervention indicates a distribution at a frequency region lower than that in the case of the lane keep control since a steering velocity is extremely low in the steady-state steering intervention. It is noted that since the steering velocity occurs during the steering intervention at the proximity to the frequency of the lane keep control, it is possible to make the driver's intervention determination according to the steering velocity (steering angular velocity).

Furthermore, during the steering intervention, since a large control current against the driver's intervention is outputted from controller 15, the output control current is constantly held at a output current limier Ilmt like an adhesive so that the control current distribution is concentrated in a control current limit value region as denoted by oblique lines in FIG. 3.

Figure 4:
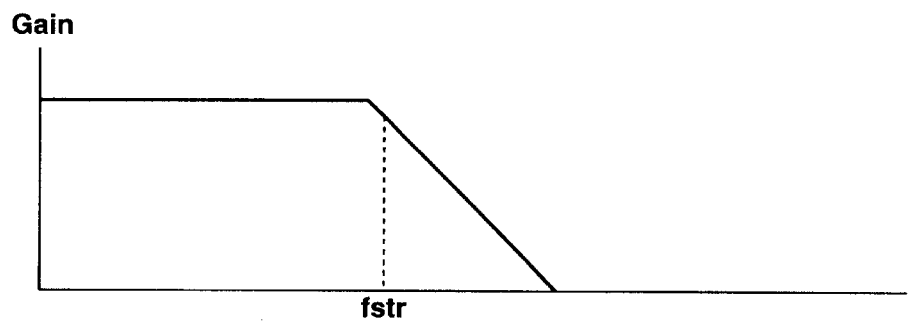
FIG. 4 is a characteristic graph representing a gain characteristic of a low-pass filter (LPF) used to detect a control current for the driver's steering intervention.
Figure 5:
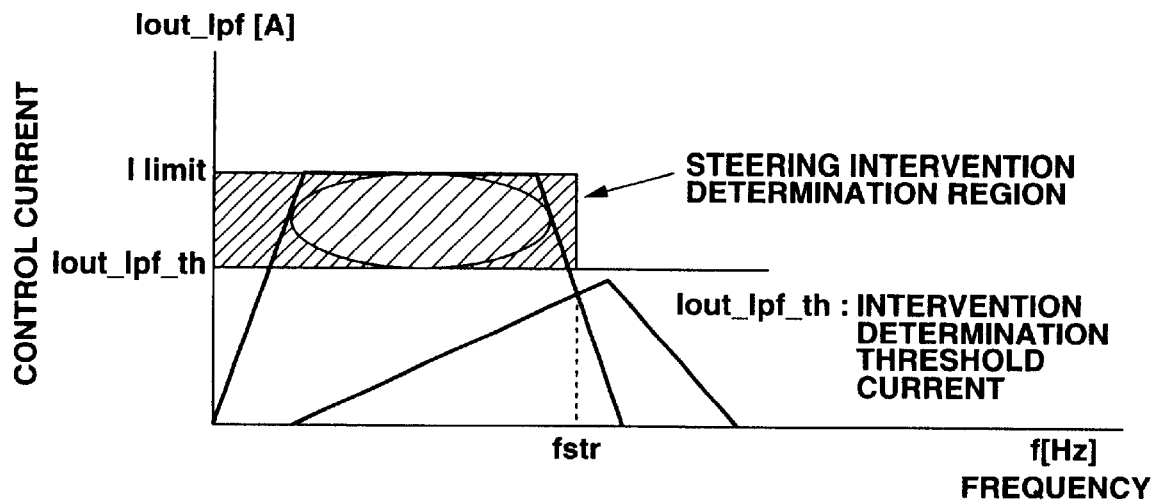
FIG. 5 is a characteristic graph representing a steering intervention determination region in a low-pass filter output current-versus-frequency relationship.

Then, the low-pass filter (refer to FIG. 4) is used which has a cut-off frequency fstr of a boundary frequency of two control current distributions. When the low-pass filter (shown in FIG. 4) processing is carried out for the control current to motor 8, a frequency characteristic only according to the control current (=filtered output current Iout_lpf) caused by the steering intervention at the low frequency region as appreciated from FIG. 5.

Furthermore, if a region such that the filtered output current Iout_lpf exceeds the steering intervention threshold current Iut_lpf_th is prescribed, this region of steering intervention determination corresponds to the control current limit value region denoted by the oblique lines in FIG. 3. In other words, if the filtered output current Iout_lpf is in excess of the steering intervention threshold current Iout_lpf, controller 15 can determine that the driver performs the steady-state steering intervention.

Next, an advantage in the first embodiment will be described below.

In the first embodiment, the control current is used to determine the driver's steering intervention and, during the driver's steering intervention determination, control mode is gradually transferred to a manual steering mode by the vehicular driver. Hence, although the driver's steering intervention determination is based on the determination without use of the torque sensor to directly detect the driver's steering intervention or without use of the steering angle sensor to indirectly detect the driver's steering intervention, the steady state steering intervention which does not generate the steering angular velocity can accurately be determined and such a large difference in the unmatched feeling of steering due to a steering interference between the lane keep control and the manual steering intervention by the driver can be eliminated.

It is noted that in a case where the cut-off frequency of the low-pass filter (LPF) is varied according to the vehicular velocity, a more accurate determination of the steady-state steering intervention can be carried out as will be described later.

Second Embodiment

The whole configuration of the lane keeping assistance control is the same as that in the first embodiment shown in FIGS. 1A and 1B. Hence, the detailed explanation of the system configuration will herein be omitted.

Figure 6:
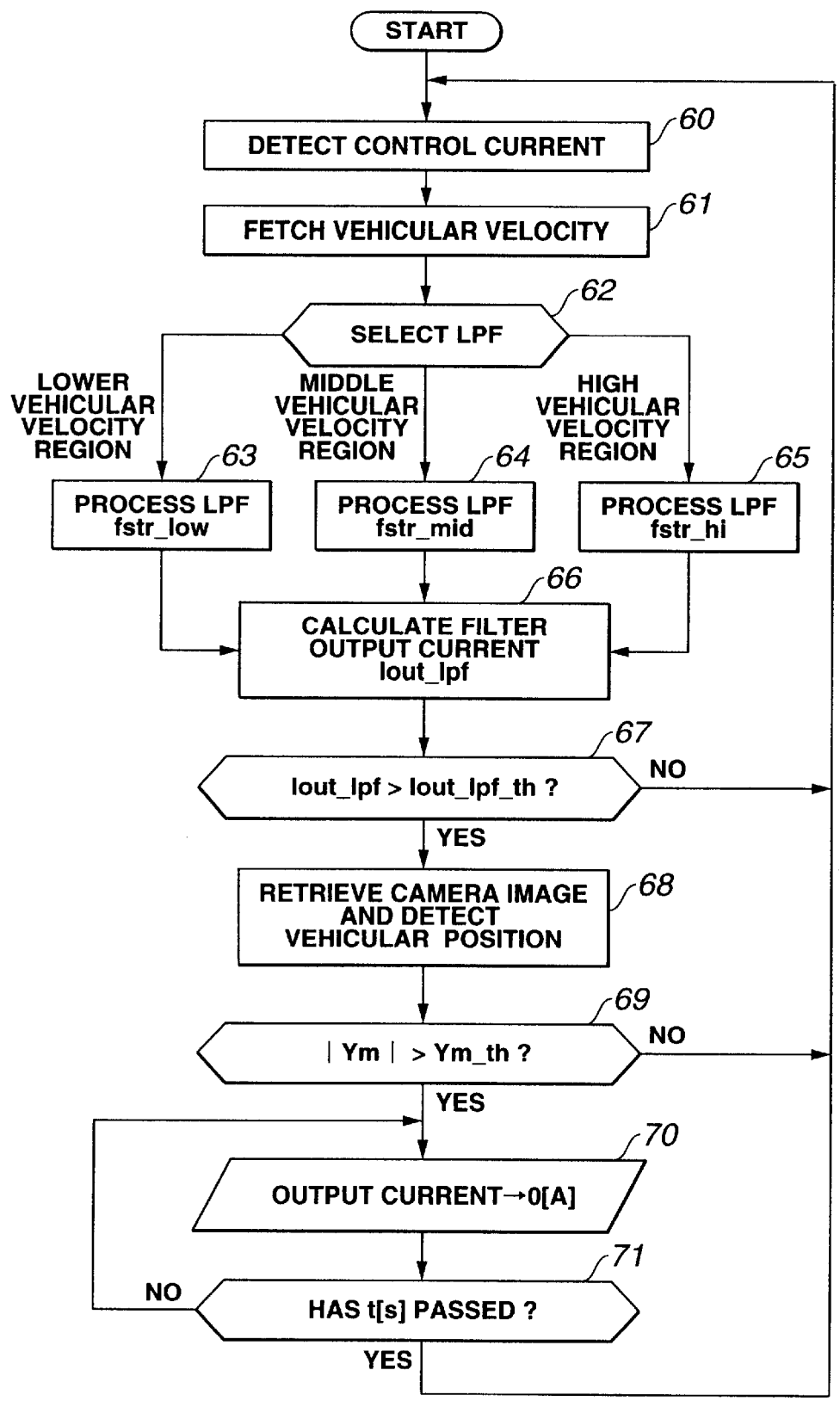
FIG. 6 is an operational flowchart executed in automatic steering controller and representing a flow of a steering intervention determination procedure in a second preferred embodiment according to the present invention.

FIG. 6 shows an operational flowchart representing a flow of the steering intervention determination procedure executed by automatic steering controller 15 in the second preferred embodiment.

At a step 60 in FIG. 6, automatic steering controller 15 detects the control current outputted to motor 8.

At a step 61, controller 15 retrieves the vehicular velocity.

At a step 62, controller 15 selects one of low-pass filters having difference cut-off frequencies according to a magnitude of the vehicular velocity retrieved at step 61. The magnitude of the vehicular velocity is divided into three regions, i.e., a low vehicular velocity region, a middle vehicular velocity region, and a high vehicular velocity region.

At a step 63, controller 15 executes the low-pass filtering procedure using the low vehicular velocity region low pass filter having the cut-off frequency fstr_low for the detected control current at step 60.

At a step 64, controller 15 executes the low-pass filtering procedure using the middle vehicular velocity region low-pass filter having the cut-off frequency frst_mid for the detected control current at step 60.

While, at a step 65, controller 15 executes the low-pass filtering procedure using the high vehicular velocity region low-pass filter having the cut-off frequency frst_hi for the detected control current at step 60.

At a step 66, the filtered control current Iout_lpf is calculated from the low-pass filtered control current passed at any one of steps 63, 64, and 65.

At a step 67, controller 15 determines if the filtered output current Iout_lpf calculated at step 66 is in excess of the steering intervention threshold current Iout_lpf_th. If No (Iout_lpf ≦ Iout_lpf_th) at step 67, controller 15 determine that there is no steering intervention and the routine returns to step 60. If Yes at step 67, the routine goes to a step 68.

At step 68, controller 15 retrieves a camera image and detects a lateral deviation Ym of a vehicular running position from a center position of the host vehicle running traffic lane.

At step 69, controller 15 determines if an absolute value |Ym|of the lateral deviation detected at step 68 is in excess of an external disturbance determination deviation threshold Ym_th. If No (|Ym|≦Ym_th) at step 69, controller 15 determines that there is no steering intervention and the routine returns to step 60. If Yes at step 68, the routine goes to a step 70.

At step 70, controller 15 reduces gradually the output current toward zero 0 [A]. It is noted that basically the control may be turned off during the steering intervention. However, the abrupt change results in the unmatched steering feeling and, therefore, the output current is gradually reduced.

At the next step 71, controller 15 determines if the time duration from the time at which the controller 15 determines Yes at step 69 has passed by the set time t [sec.]. Until the set time t, the reduction process of the output current at step 70 is continued. It is noted that the return condition is not determined from the output current since the output current is already reduced but is the automatic return according to the time management.

[Vehicular Velocity Dependent Change in Out-off Frequency]

An action to differ the cut-off frequency of the low-pass filter according to the vehicular velocity will be explained below.

During the vehicular run in the automatic steering mode, controller 15 at step 62 selects one of the low-pass filters having mutually different cut-off frequencies according to the magnitude of the vehicular velocity (low vehicular velocity region, the middle vehicular velocity region, and the high vehicular velocity region). In other words, at the low vehicular velocity region, the low vehicular velocity region low-pass filter having the cut-off frequency fstr_low. At the middle vehicular velocity region, the middle vehicular velocity region low-pass filter having the cut-off frequency fstr_mid is selected. At the high vehicular velocity region, the high vehicular velocity region low-pass filter having the cut-off frequency frst_hi is selected. Then, the low-pass filtering process is carried out for the detected control current at any one of steps 63, 64, and 65 and at step 66 the filtered output current Iout_lpf is calculated.

Figure 7:
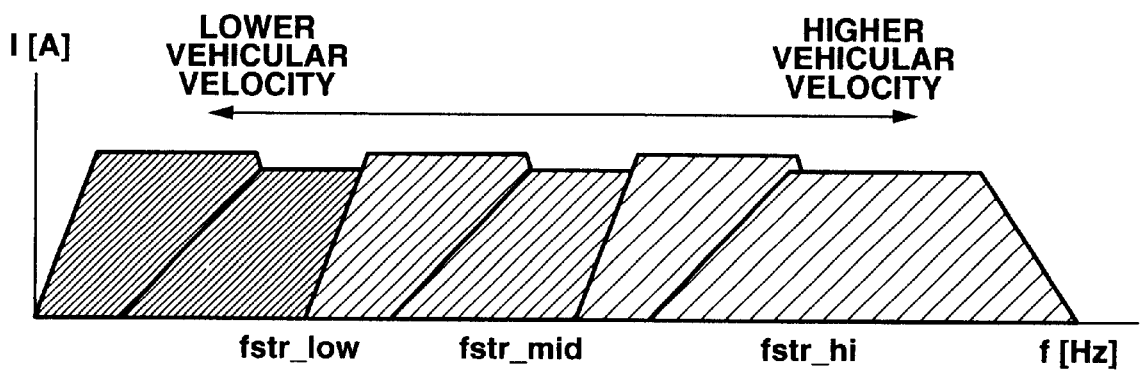
FIG. 7 is a characteristic graph representing a control current-versus-frequency at a low velocity region, a middle velocity region, and a high velocity region.

In details, as shown in FIG. 7, in the lane keep control, a control response to follow the traffic lane is increased as a rise in the vehicular velocity so that the control current distribution during the lane keep control is shifted toward the higher frequency side. In the same way, the control current distribution due to the driver's steering intervention is also shifted toward the higher frequency side as the vehicular velocity is increased. In other words, suppose that the boundary frequency of the two control current distribution during the driver's steering intervention and the lane keep control is the cut-off frequency. As shown in FIG. 7, the boundary frequency is varied in such a way as the cut-off frequency fstr_low at the low vehicular velocity region, that fstr_mid at the middle vehicular velocity region, and that fstr_hi at the high vehicular velocity region.

Figure 8:
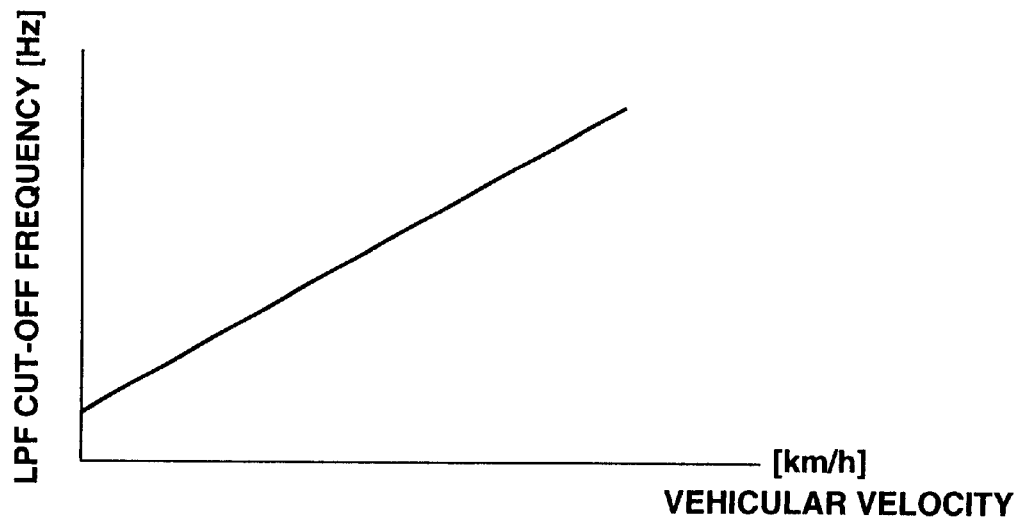
FIG. 8 is a characteristic graph representing a cut-off frequency characteristic of the low-pass filter with respect to a vehicular velocity.

For a switching method of the cut-off frequency according to the vehicular velocity, it is desirable to vary continuously the cut-off frequency according to the vehicular velocity as shown in FIG. 8. However, in terms of processing capacity, such a method that several low-pas filters having the different cut-off frequencies are prepared and these filters are switched is general. For example, in the case of the second embodiment, three cut-off frequencies are switched as shown in FIG. 9.

Hence, since the cut-off frequency fstr of the low-pass filter is varied according to the vehicular velocity, the more accurate determination of the steady-state steering intervention can be made.

[Steering Intervention Determination Action]

During the vehicular run in the automatic steering mode, if the filtered output current Iout_lpf is in excess of the steering intervention threshold current Iout_lpf_th at step 67 and the detected lateral deviation absolute value |Ym|is in excess of the set external disturbance determination threshold Ym_th, controller 15 determines that the driver (driver' steering operation) has intervened the automatic steering and the routine shown in FIG. 6 goes to step 70 at which controller 15 reduces gradually the control current for motor 8 of the assistance actuator.

Figure 10:
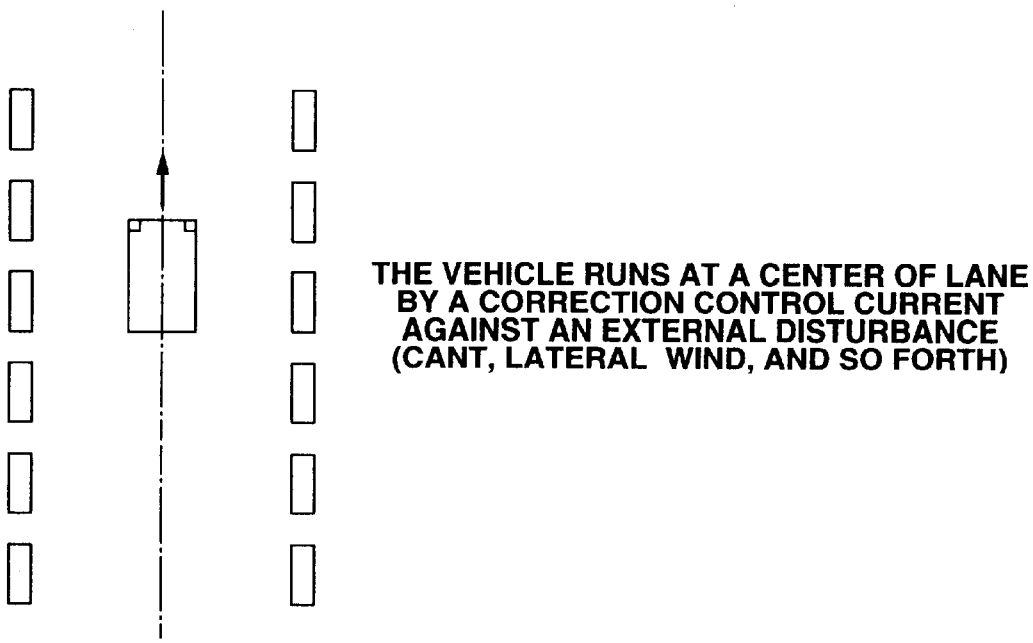
FIG. 10 is an explanatory view representing a vehicular position with respect to a traffic lane during an input of an external disturbance to the vehicle.
Figure 11:
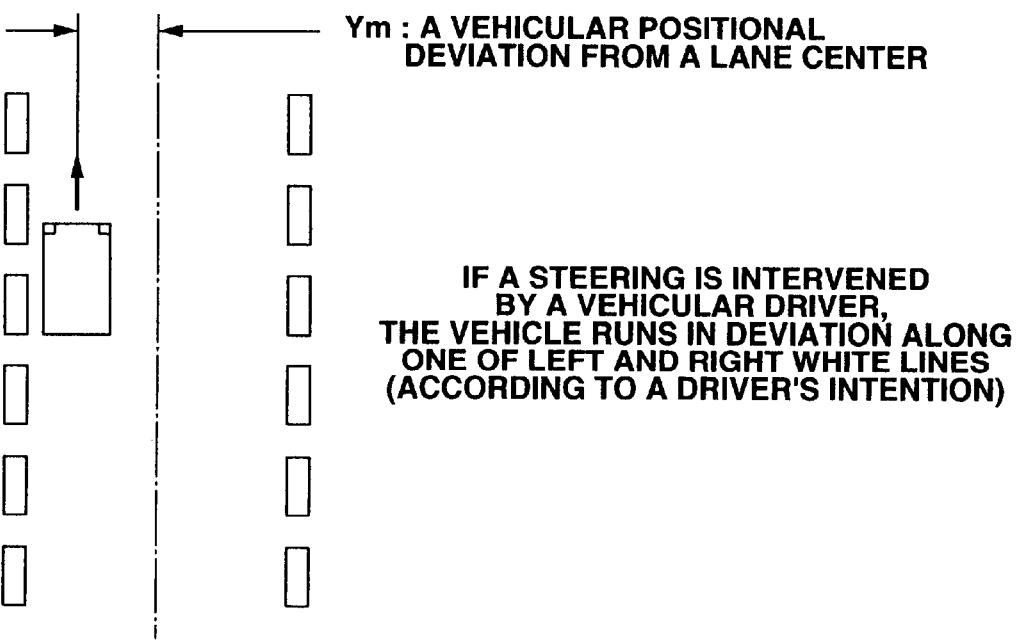
FIG. 11 is an explanatory view representing the vehicular position with respect to the traffic lane during the input of the driver's steering intervention.

That is to say, as shown in FIG. 10, the control current is supplied to motor 8 so that the host vehicle runs on a center part of the traffic lane which indicates a target traffic lane in the lane keep control against the input of an external disturbance such as road surface cant, lateral wind, or so forth. On the other hand, as shown in FIG. 11, the control current is supplied to motor 8 so that the host vehicle is maintained to run on the traffic lane that the vehicular driver intends in the same manner as the case of the external disturbance, during the steering input by the driver. Since this control current is adhered orheldon the limit value due to the provision of the limiter in the output current, the determination of whether it is the external disturbance input time or the driver's steering input time cannot be made only by the control current value.

However, during the external disturbance input, the host vehicle, basically, runs on the center position of the traffic lane which is the target traffic lane (refer to FIG. 10). While, during the driver's steering input, the host vehicle runs on a position of the traffic lane which is deviated from the center position of the traffic lane toward one of the left and right white lines (lane markers) in order to avoid collision against a large-sized truck which is running on one of the adjacent traffic lanes or the adjacent lane (refer to FIG. 11).

Therefore, it becomes possible to distinguish the driver's steering input from the external disturbance input by determining the driver's steering intervention using a logical AND condition between the control current condition and the host vehicle position deviation condition. Hence, a more accurate determination for the steady-state steering intervention can be achieved.

It is noted that if a control current exceeding a control limitation is caused to flow into motor 8 during the occurrence in the external disturbance, the host vehicle runs deviating toward one of the left and right white lines. However, in this state, control is disabled and it is desirable to turn the control output to OFF in the same way as the case of the driver's steering intervention.

Other Embodiments

Although, in the lane keeping assistance system in each of the first and second preferred embodiment, the low-pass filter (LPF) is used to pass there through only the signal components in the low frequency range to the control current, a band pass filter (BPF) which passes the signal components of a middle frequency range between the low frequency range lower than the lower cut-off frequency and the high frequency range higher than the upper cut-off frequency may be used.

Although, in the lane keeping assistance system in each of the first and second embodiments, the present invention is applicable to the controller from which the steering torque is provided for the steering system during the automatic steering mode, the present invention is also applicable to a controller from which a steering reaction force torque is provided thereto. In the latter case, such a control that as a magnitude of the intervention from the driver becomes larger, the steering reaction torque becomes smaller is carried out.

Lane keep Assistance Main Routine)

Figure 12:
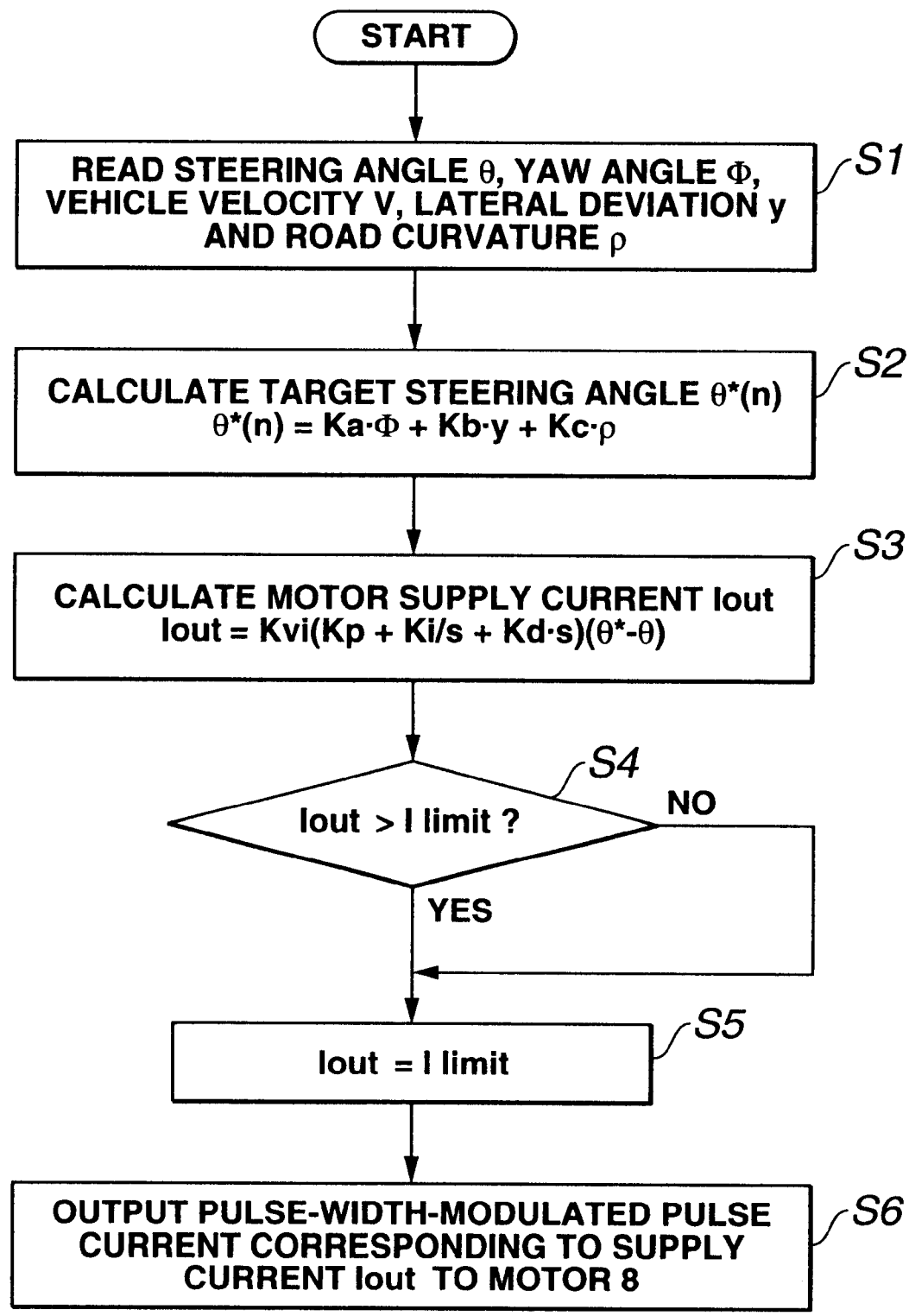
FIG. 12 is an operational flowchart representing an example of a main control routine on a lane keep control executed in the automatic steering controller.

FIG. 12 shows an operational flowchart representing an example of the lane keep control procedure executed by automatic steering controller 15 in each embodiment during the automatic steering mode.

FIG. 12 is a main interrupt routine executed whenever a predetermined period of time, for example, 10 milliseconds has passed.

At a step S1, controller 15 reads actual steering angle $\theta$ detected by steering angle sensor 13, a vehicular velocity detection value V detected by vehicular velocity sensor 17, a yaw angle $\Phi$, lateral deviation y, and a radius of curvature $\rho$ of the extracted white line detected from CCD camera 16 and image processed by controller 15. Then, the routine goes to a step S2.

At step S2, controller 15 calculates a target steering angle $\theta^*$ using the following equation (1) on the basis of the yaw angle $\Phi$, the vehicular lateral deviation y, and the radius of curvature $\rho$.

$$\theta^* = Ka \cdot \Phi + Kb \cdot y + Kc \cdot \rho \tag{1}$$

In the equation (1), Ka, Kb, and Kc denote preset control gains varied according to the vehicular velocity and target steering angle $\theta^*$ indicates a positive value when the steering direction is in a clockwise direction as viewed from the driver's position and a negative value when the steering direction is in a counter-clockwise direction as viewed from the driver's position.

Next, at a step S3, automatic steering controller 15 calculates the motor supply current Iout using the following equation (2) and performs a PID (Proportional-Integration-Differential) control to make the actual steering angle $\theta$ substantially equal to target steering angle $\theta^*$. Then, the motor supply current, i.e., the output current from controller 15 to motor 8 is stored into a motor supply current memory location to update the corresponding contents of the motor supply current memory location.

$$\text{Iout} = Kvi(Kp + Ki/s + kd \cdot s)(\theta^* - \theta) \tag{2}$$

In the equation (2), Kvi denotes a control gain to convert a voltage value into a current value, Kp denotes a proportional gain, Ki denotes an integration gain, and Kd denotes a differential gain.

It is noted that a reason for controller 15 to calculate the motor supply current Iout using the above-described equation (2) is that controller 15 subtracts actual steering angle $\theta$ to derive a deviation $\Delta\theta$ from both steering angle values, performs the PID calculation for the deviation $\Delta\theta$ to derive a target motor control voltage V*, and converts target motor control voltage V* into the corresponding current value by a multiplication of the target motor control voltage V* by control gain Kvi to calculate the motor supply current Iout to motor 8, and the series of these calculations are carried out in a feedback loop configuration of controller 15 itself, motor 8, and associated sensors 13, 14, 16, and 17, and, in this feedback loop configuration, controller 15 performs its equivalent calculations.

At the next step S4, automatic steering controller 15 determines whether the calculated motor supply current Iout is in excess of the current limit value Ilimit stored in a current limit value memory location. If Iout $\leq$ Ilimit at step S4, the routine goes to a step S6. If Iout >Ilimit at step S4, the routine goes to a step S5.

At step S5, automatic steering controller 15 assigns the current limit value Ilimit (Ilimit→Iout) and stores this motor supply current Iout (,i.e., Ilimit) into the motor supply current memory location to update the corresponding contents and the routine goes to step S6.

At step S6, controller 15 outputs the motor supply current (control current) Iout stored in the motor supply current memory location which is pulse-width modulated in PWM (Pulse-Width Modulator) circuit 15g to motor 8 whose direction is in accordance with the present steering direction.

Traffic lane information detecting means corresponds to CCD camera 16 and automatic steering controller 15. Steering angle detecting means corresponds to steering angle sensor 13 and is exemplified by a U.S. Pat. No. 6,155,106 issued on Dec. 5, 2000. The CCD camera is exemplified by a U.S. Pat. No. 6,226,592 issued on May 1, 2001. A controlled steering target value corresponds to target steering angle θ* described above. A control command value corresponds to the control current Iout (this corresponds to the motor supply current). It is also noted that angle sensor 14 shown in FIG. 1A is used to detect the rotational angle of drive gear 10 to confirm the present steered position of the vehicle, electromagnetic clutch 9 is in the clutched state in response to the clutch command from automatic steering controller 15 during the automatic steering mode, and the automatic steering corresponds to a controlled steering.

The entire contents of a Japanese Patent Application No. 2000-268218 (filed in Japan on Sep. 5, 2000) are herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

What is claimed is:

1. A lane keeping assistance system for an automotive vehicle, comprising:
    a traffic lane information detector to detect an information related to a traffic lane on which the vehicle is about to run;
    a steering angle sensor to detect a steering angle of a steering wheel of the vehicle;
    a steering position changing section by which the steering wheel of the vehicle is enabled to be displaced independently of a manual steering operation through the steering wheel;
    a controlled steering target value setting section that sets a controlled steering target value when a controlled steering to follow the traffic lane is carried out on the basis of at least the traffic lane related information detected by the traffic lane information detector and the steering angle detected by the steering angle sensor;
    a controlled steering command value setting section that outputs a control command value in accordance with the controlled steering target value;
    a control command value filtering section that filters the control command value to pass only frequency components of the control command value lower than a predetermined filter threshold value to derive a filtered control command value during an execution of the controlled steering;
    a manual steering intervention detector to detect a steering intervention state to the controlled steering by the manual steering operation when the filtered control command value is in excess of a predetermined threshold control command value; and
    a controlled steering target value limiter to reduce the control command value toward zero value to suppress the controlled steering target value toward a lower value direction including zero when the manual steering intervention is detected by the manual steering intervention detector.

2. A lane keeping assistance system for an automotive vehicle as claimed in claim 1, further comprising:
    a vehicular velocity detector to detect a vehicular velocity of the vehicle; and
    a predetermined threshold value varying section that varies the predetermined filter threshold value when the control command value filtering section provides the filter for the control command value to pass only predetermined frequency components lower than the predetermined filter threshold value, and
    wherein the predetermined threshold value varying section varies the predetermined threshold value of the filter thereof toward a higher frequency side as the detected vehicular velocity becomes increased.

3. A lane keeping assistance system for an automotive vehicle as claimed in claim 1, further comprising a lateral displacement detector to detect a lateral displacement of the vehicle from a center position of the traffic lane on the basis of the traffic lane information from the traffic lane information detector and wherein the manual steering intervention detector detects the steering intervention state by the manual steering operation when the filtered control command value is in excess of the predetermined threshold control command value and the detected lateral displacement is in excess of an external disturbance determination threshold value.

4. A lane keeping assistance system for an automotive vehicle as claimed in claim 1, wherein the steering position changing section comprises an electric motor and the control command value is a current to be supplied to the electric motor.

5. A lane keeping assistance system for an automotive vehicle as claimed in claim 1, wherein the filter of the control command value filtering section comprises a low-pass filter and the predetermined filter threshold value is a cut-off frequency of the low-pass filter.

6. A method applicable to a lane keeping assistance system for an automotive vehicle in which a control current is outputted to a motor of an automatic steering actuator coupled to a vehicular steering system to provide a steering force thereto to follow the vehicle along a traffic lane on a road located in a vehicular forwarding direction during a vehicular run in an automatic steering mode, the method comprising:
    detecting the control current to be outputted to the motor during the automatic steering mode;
    providing a filter for the detected control current to pass only signal components of the detected control current whose frequencies are lower than a predetermined threshold frequency value of the filter to derive a filtered control current;
    determining whether a manual steering intervention to the automatic steering occurs according to a magnitude of the filtered control current, the manual steering intervention being determined to occur depending on whether the magnitude of the filtered control current is in excess of a predetermined threshold current value of the filter; and
    reducing the control current outputted to the motor toward zero value when, at the manual steering intervention determining step, the manual steering intervention is determined to occur according to a result of determination that the magnitude of the filtered control current is in excess of the predetermined threshold current value.

7. A method applicable to a lane keeping assistance system for an automotive vehicle as claimed in claim 6, further comprising detecting a vehicular velocity and wherein the predetermined threshold frequency value is a cut-off frequency of the filter, the cut-off frequency being varied toward a higher frequency side as the detected vehicular velocity becomes higher.

8. A method applicable to a lane keeping assistance system for an automotive vehicle as claimed in claim 6, further comprising: detecting a vehicular velocity, wherein the filter comprises a low vehicular velocity low-pass filter having a lowest cut-off frequency ($fstr\_low$), a middle vehicular velocity low-pass filter having a second lowest cut-off frequency ($fstr\_mid$), and a high vehicular velocity low-pass filter having a highest vehicular velocity cut-off frequency ($fstr\_hi$), and wherein, at the filter providing step, one of the low-pass filters is selected according to a magnitude of the detected vehicular velocity and the filtered control current is calculated.

9. A method applicable to a lane keeping assistance system for an automotive vehicle as claimed in the claim 8, further comprising detecting a traffic lane related information and detecting a lateral deviation of a vehicular position from a center position of the traffic lane on the basis of the detected traffic lane related information and wherein, at the manual steering intervention determining step, the manual steering intervention is determined to occur when the filtered control current is in excess of the predetermined threshold current value and when the detected lateral deviation is in excess of an external disturbance determination threshold value.

10. A method applicable to a lane keeping assistance system for an automotive vehicle as claimed in claim 9, wherein, at the control current reducing step, the control current is gradually reduced toward zero value.

11. A lane keeping assistance system for an automotive vehicle, comprising:

traffic lane information detecting means for detecting an information related to a traffic lane on which the vehicle is about to run;

steering angle detecting means for detecting a steering angle of a steering wheel of the vehicle;

steering position changing means by which the steering wheel of the vehicle is enabled to be displaced independently of a manual steering operation through the steering wheel;

controlled steering target value setting means for setting a controlled steering target value when a controlled steering to follow the traffic lane is carried out on the basis of at least the traffic lane related information detected by the traffic lane information detecting means and the steering angle detected by the steering angle detecting means;

controlled steering command value setting means for outputting a control command value in accordance with the controlled steering target value;

control command value filtering means for filtering the control command value to pass only frequency components of the control command value lower than a predetermined filter threshold value to derive a filtered control command value during an execution of the controlled steering;

manual steering intervention detecting means for detecting a steering intervention state to the controlled steering by the manual steering operation when the filtered control command value is in excess of a predetermined threshold control command value; and controlled steering target value limiting means for reducing the control command value toward zero value to suppress the controlled steering target value toward a lower value direction including zero when the manual steering intervention is detected by the manual steering intervention detecting means.

* * * * *